US012769256B2

(12) United States Patent
Meylan

(10) Patent No.: US 12,769,256 B2
(45) Date of Patent: Oct. 20, 2026

(54) DIAL FOR A WATCH

(71) Applicant: Moser Schaffhausen AG, Schaffhausen (CH)

(72) Inventor: Edouard Meylan, Erlenbach (CH)

(73) Assignee: Moser Schaffhausen AG, Schaffhausen (CH)

( * ) Notice: Subject to any disclaimer, the term of this patent is extended or adjusted under 35 U.S.C. 154(b) by 290 days.

(21) Appl. No.: 18/285,978

(22) PCT Filed: Mar. 8, 2022

(86) PCT No.: PCT/EP2022/055875
§ 371 (c)(1),
(2) Date: Oct. 6, 2023

(87) PCT Pub. No.: WO2022/214260
PCT Pub. Date: Oct. 13, 2022

(65) Prior Publication Data
US 2024/0184249 A1 Jun. 6, 2024

(30) Foreign Application Priority Data
Apr. 6, 2021 (CH) .................................... 00351/21

(51) Int. Cl.
*G04B 45/00* (2006.01)
*B44F 1/04* (2006.01)
(Continued)

(52) U.S. Cl.
CPC .......... *G04B 45/0084* (2013.01); *B44F 1/045* (2013.01); *G04B 19/106* (2013.01); *G04B 19/12* (2013.01)

(58) Field of Classification Search
CPC ... G04B 45/0084; G04B 19/12; G04B 19/106
See application file for complete search history.

(56) References Cited

U.S. PATENT DOCUMENTS 3,162,008 A * 12/1964 Berger .............. G04B 45/0007 D10/34
3,910,033 A * 10/1975 Saito ...................... G04B 19/12 968/156
(Continued)

FOREIGN PATENT DOCUMENTS

CH 548 367 A4 1/1970
EP 3 709 102 A1 9/2020
JP 10-142355 A 5/1998

OTHER PUBLICATIONS

Machine Translation of CH548367.*
(Continued)

*Primary Examiner* — Edwin A. Leon
*Assistant Examiner* — Jason M Collins
(74) *Attorney, Agent, or Firm* — Sughrue Mion, PLLC

(57) ABSTRACT

A dial for a watch, in particular a wristwatch, having a disk with a surface on which information is arranged. Some of the information is transparent, the transparent information being visible or at least nearly invisible according to the viewing angle. The dial of the invention has a simple and yet sophisticated look. Furthermore, the dial allows a watch-maker's name to be shown without same significantly impacting the look.

16 Claims, 3 Drawing Sheets

(51) Int. Cl.
*G04B 19/10* (2006.01)
*G04B 19/12* (2006.01)

(56) References Cited

U.S. PATENT DOCUMENTS

| | | | | | |
|---|---|---|---|---|---|
| 5,734,627 | A * | 3/1998 | Sy | G04B 19/30 368/227 |
| 5,793,470 | A * | 8/1998 | Haseltine | G03B 21/26 349/96 |
| 8,026,930 | B2 * | 9/2011 | Childress | G06F 21/84 715/768 |
| 8,758,884 | B2 * | 6/2014 | Hiroe | G04B 19/10 368/239 |
| 11,302,515 | B2 * | 4/2022 | Boulmay | G04B 29/022 |
| 11,971,686 | B2 * | 4/2024 | Marlot Doerr | G04B 45/0015 |
| 12,399,463 | B2 * | 8/2025 | Willemin | G04B 45/0015 |
| 2004/0196742 | A1 * | 10/2004 | Gouthier | G04B 19/10 368/232 |
| 2020/0293001 | A1 * | 9/2020 | Jeanrenaud | G04B 19/12 |
| 2021/0223743 | A1 * | 7/2021 | Baba | G04G 9/0076 |
| 2021/0405586 | A1 * | 12/2021 | Hoshino | G04D 3/0048 |
| 2023/0229116 | A1 * | 7/2023 | Yuen | G04B 19/12 |

OTHER PUBLICATIONS

International Search Report for PCT/EP2022/055875 dated Jun. 30, 2022.
Written Opinion for PCT/EP2022/055875 dated Jun. 30, 2022.

* cited by examiner

DIAL FOR A WATCH

CROSS-REFERENCE TO RELATED APPLICATIONS

This application is a National Phase Application of PCT International Application No. PCT/EP2022/055875, having an International Filing Date of Mar. 8, 2022, claiming priority to Patent Application No. 00351/21, filed Apr. 6, 2021 each of which is hereby incorporated by reference in its entirety.

TECHNICAL FIELD

The present invention relates to a dial for a watch, in particular for a wristwatch, and to a watch.

PRIOR ART

Much time and attention is devoted to decorating dials of watches. The appearance of the dial is often crucial for its purchase. Some watches thus provide a maximum amount of information going beyond a pure time display. Other dials have complicated decorations or they have a rather unusual or striking design. The logo or the company name of the watch manufacturer is conventionally indicated on the dial.

Dials are subject to fashions and regular innovations are in demand on the market.

SUMMARY OF THE INVENTION

It is therefore an object of the invention to provide a dial for a watch, in particular for a wristwatch, which has as simple but as elegant an appearance as possible.

The dial according to the invention for a watch, in particular for a wristwatch, has a plate with a surface on which information is applied. According to the invention, some of the information is transparent, wherein this portion of the information is visible or is at least approximately invisible depending on the viewing angle.

As a result, the dial can be simply configured. At first view, the dial therefore has hardly any information, if any at all. If the spatial position of the watch is changed, e.g. the wrist is turned, the transparently presented information can also be seen at a suitable angle.

At a first angle, also called viewing angle here, the transparent information is therefore scarcely visible, if at all; at a second viewing angle differing therefrom, the transparent information can be seen. Depending on the type and/or size of the information provided, all of the visible information can be seen at a single angle, or the watch has to be moved in order to see all of the information and therefore the angle has to be slightly changed.

Preferably, the plate is opaque or translucent, i.e. semi-transparent, or dark, at least below this transparent information. As a result, at least a portion of the light falling onto the plate is reflected and, owing to light refraction, the transparent information can be seen at a suitable angle of incidence or reflection angle of the light.

Preferably, a surface of the plate, on which the transparent portion of the information is presented, is shiny. As a result, the reflected portion of the incident light is increased and the transparently presented information can be better seen at a suitable reflection angle.

Preferably, the transparent portion of the information comprises a manufacturer's name and/or a manufacturer's logo. As a result, the manufacturer's name is also seen on a watch worn on the wrist without always being visible in a pronounced way. This sets a new trend and the appearance of the watch is refined as a result. Furthermore, the company name thus does not have an interfering effect on the rest of the design of the dial.

In preferred embodiments, with the exception of a first passage opening for hands and further passage openings, present if need be, for index displays and/or markings, the plate forms a continuously closed face without further passage openings. As a result, the plate does not have any windows in which the interior of the watch can be seen or in which rotary disks or other display elements are provided. The appearance can thereby be kept simple.

Even the plate itself preferably does not have any imprints or display elements which are always visible, with the exception of the index details which are present if need be and, by means of markings, indicate the hours or possibly merely every three hours.

In other embodiments, further recesses are present, for example as a receptacle or as a viewing window for a tourbillon.

The plate preferably has a main body made of metal and/or an alloy, preferably of brass. The plate preferably forms the main body. Said main body can be processed and refined in a known manner, for example can be ground, rhodium-plated, varnished and imprinted. For example, dial feet can be welded thereon and/or holes drilled therein and/or the outer diameter can be formed by punching.

In preferred embodiments, the transparent portion of the information is applied to this region of the plate as an uppermost layer. This layer can be flush with the adjacent surface of the plate or can be elevated above it. The visible portion of the information is preferably elevated above adjacent portions of the plate. Since said portion is elevated above its surroundings in this region or since it forms the uppermost layer, light can be incident thereon and reflected unobstructed by lateral elevations, and therefore the conventionally invisible portion of the information is visible at a suitable angle.

The transparent information can be provided on the plate in different ways. For example, the plate can be correspondingly imprinted, provided with holographic elements or with different types of recessed or elevated physical elements. The information is preferably a 3D print or elevated in some other form. Other types of providing information are also possible.

The watch according to the invention has a dial which comprises a plate with a surface on which information is provided. According to the invention, some of the information is transparent, wherein this portion of the information is visible or at least approximately invisible depending on the viewing angle. The watch has a transparent dial covering which covers the dial, wherein, when the dial is viewed in a first direction with respect to the surface of the plate, the transparent portion of the information is transparent and cannot or can scarcely be seen, and wherein, when the dial is viewed in a second direction, differing from the first direction, with respect to the surface of the plate, the transparent portion of the information allows the transparent portion of the information to be seen.

Further embodiments are indicated in the dependent claims.

BRIEF DESCRIPTION OF THE DRAWINGS

Preferred embodiments of the invention are described below with reference to the drawings which serve merely for explanation and should not be interpreted as being restrictive. In the drawings.

DESCRIPTION OF PREFERRED EMBODIMENTS

Figure 1:
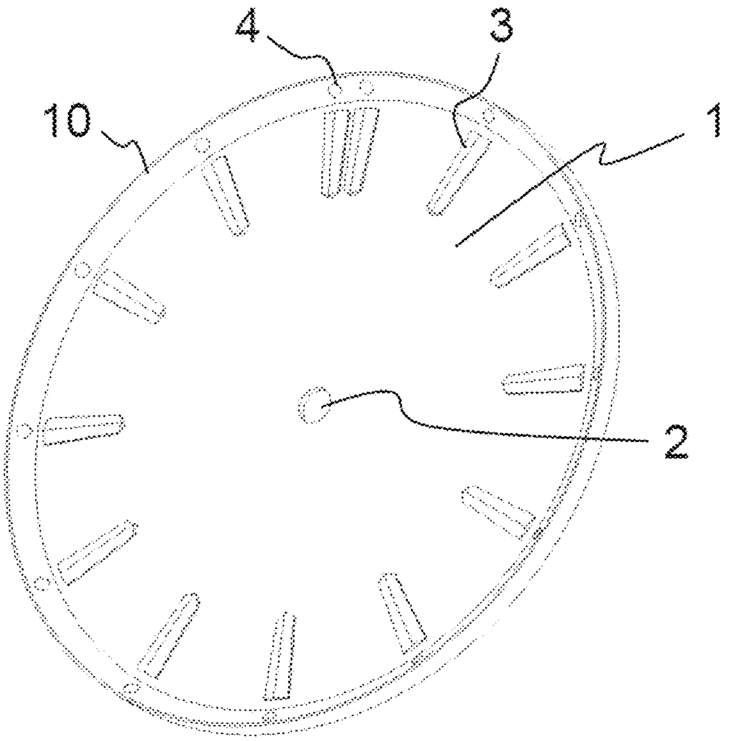
FIG. 1 shows a perspective illustration of a dial according to the invention according to a first embodiment, at a first viewing angle.
Figure 2:
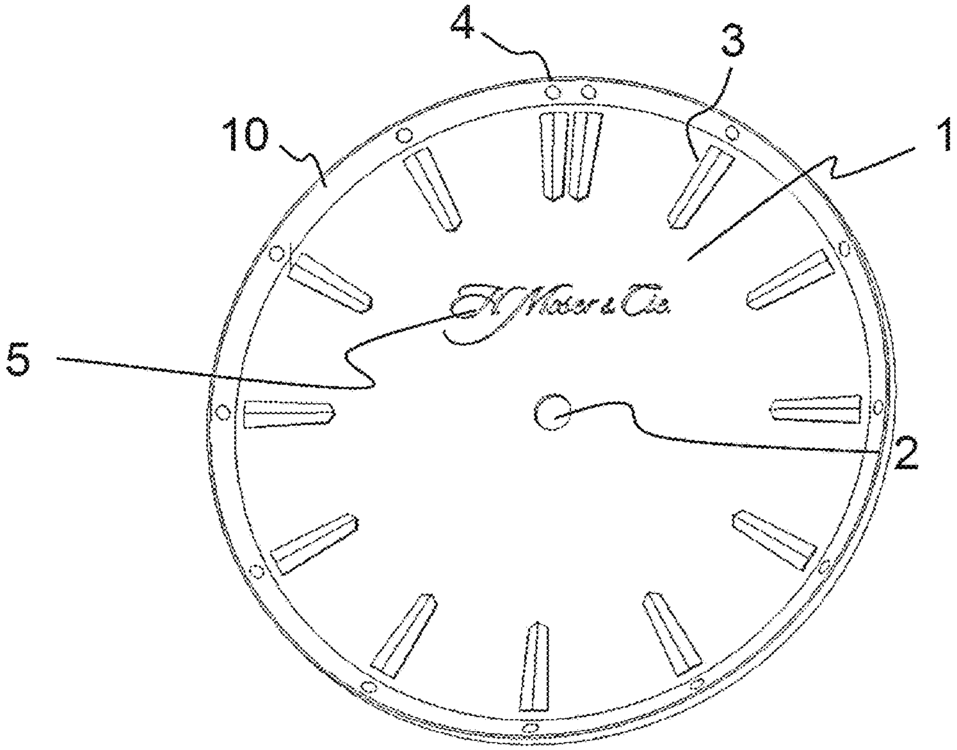
FIG. 2 shows a perspective illustration of the dial according to FIG. 1, at a second viewing angle.

FIGS. 1 and 2 illustrate a preferred first embodiment of the dial according to the invention.

Figure 3:
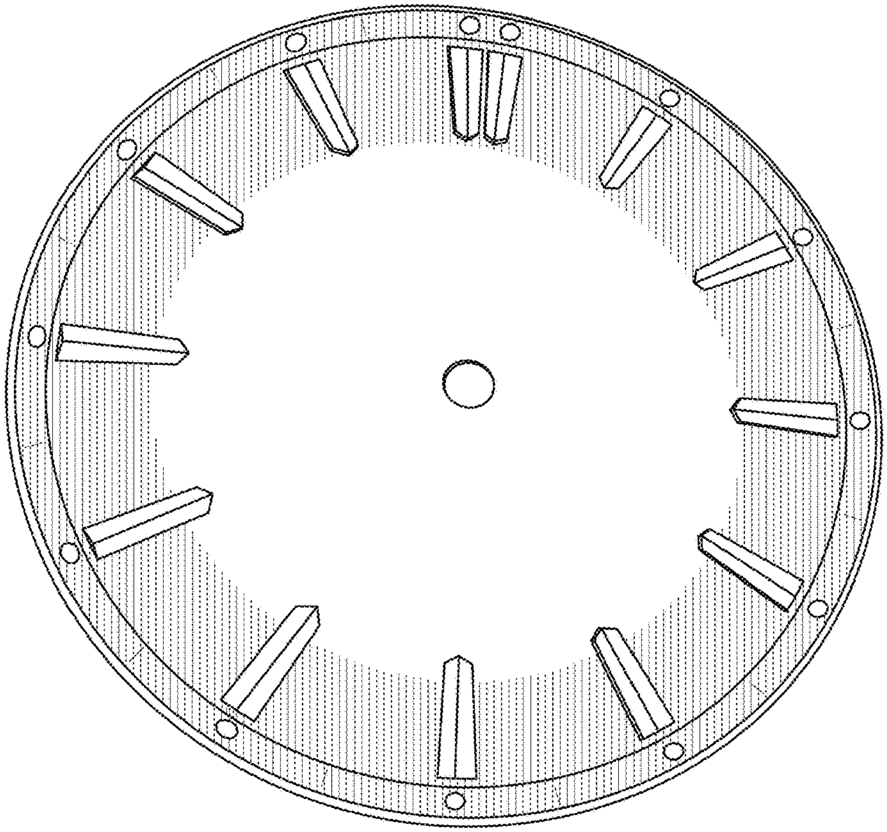
FIG. 3 shows a photographic illustration of the dial according to the invention in a first perspective.
Figure 4:
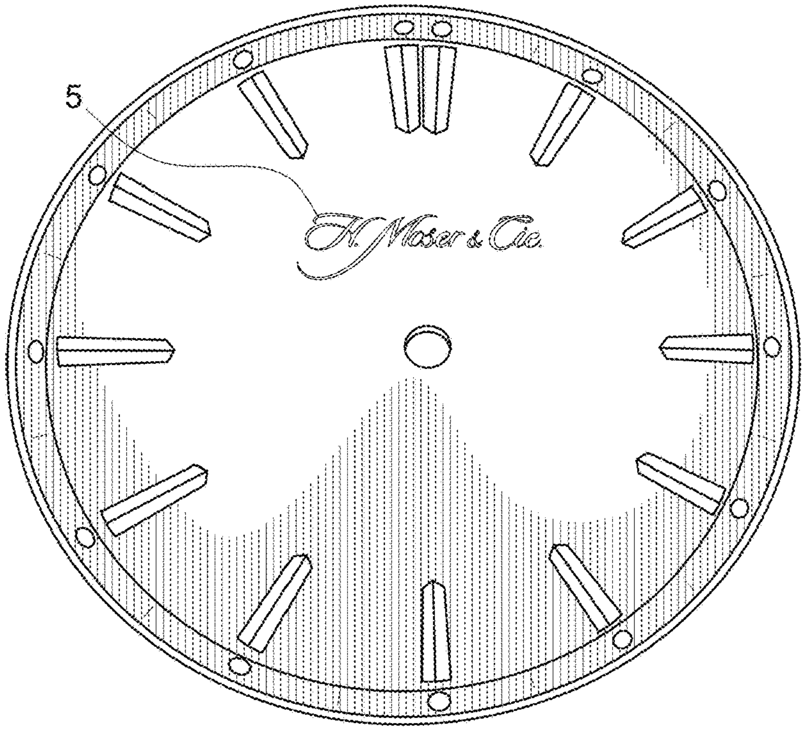
FIG. 4 shows a photographic illustration of the dial according to FIG. 3 in a second perspective.

FIGS. 3 and 4 show photos of said dial.

Said dial can be used in particular for a wristwatch.

The dial according to the invention has a plate 1. The plate 1 is plane-parallel or has a plane surface, depending on the embodiment. Depending on the embodiment, it has a raised edge 10, as is illustrated here. The edge and the remaining portion of the plate, i.e. the main body, can be integrally formed together, or the edge is fastened to the plate.

The plate 1 is preferably composed of a metal and/or an alloy, even more preferably of brass. Other materials can also be used. The plate 1 has a first passage opening 2 for connecting hands to a watch work. The hands are not illustrated here. They can be designed in a known manner. There can optionally be hours, minutes and seconds hands and/or other hands.

Indices 3 which indicate the hours and/or minutes are preferably distributed over the circumference of the plate 1. Their configuration is as desired and well known in the prior art. In this example, the indices are in the form of bars. Depending on the embodiment, the indices 3 are fastened on the plate 1 or the plate 1 has recesses or passage openings into which the indices 3 are inserted.

Further elements can also be provided in or on the dial. In this example, the raised edge 10 is provided with markings 4 which are likewise inserted as physical elements or components into recesses or fastened on the edge in some other way.

In this example, the plate 1 is circular. Other cross-sectional shapes are likewise possible, for example elliptical, oval or polygonal.

The plate 1 has a surface which is visible when the watch is worn. This surface is preferably polished, for example sun-brushed. The plate 1, preferably at least the surface, is preferably rhodium-plated. The surface of the plate 1 is preferably shiny. It is preferably colored, for example varnished. Preferably, more than one layer of varnish is present. The surface is preferably dark and it is preferably opaque. All of these properties are preferably present in cumulative form.

Depending on the embodiment, the surface of the plate 1 has a uniform color. It is preferably iridescent.

In this example, the indices 3 and the markings 4 present information which is always visible. That is to say, that they can be seen at every viewing angle of the surface of the dial. In the illustration according to FIGS. 1 and 3, which show a first angle, only this information on the dial can be seen.

However, the dial according to the invention also has at least one item of information on its surface that is not always visible. Said information can be seen in the form of transparent information 5 on the surface at certain angles. This is illustrated in FIGS. 2 and 4.

In this example, said transparent information is the company logo with the company name. However, other types of information, for example an inscription or a motto, can be presented in this way.

In FIG. 2, the lettering has a black border. This has been produced merely by the pictorial illustration. The lettering is provided with a transparent material and therefore does not have a black border. It is preferably imprinted. Printing methods using colored, black or white imprints for such dials are known in the prior art.

It can be seen in FIG. 4 that the lettering becomes visible by means of light reflection and reflections, wherein, in this example, it cannot be seen in its entirety, as before, at a single angle. On the contrary, the dial has to be moved in order to see the entire lettering, or the entire lettering can be seen only in an extremely narrow angular region.

The first angle is preferably formed by an angular region which is relatively large, and the second angle is formed by an angular region which is relatively small. The angular regions can be continuous regions and/or can comprise individual specific angles.

Figure 5:
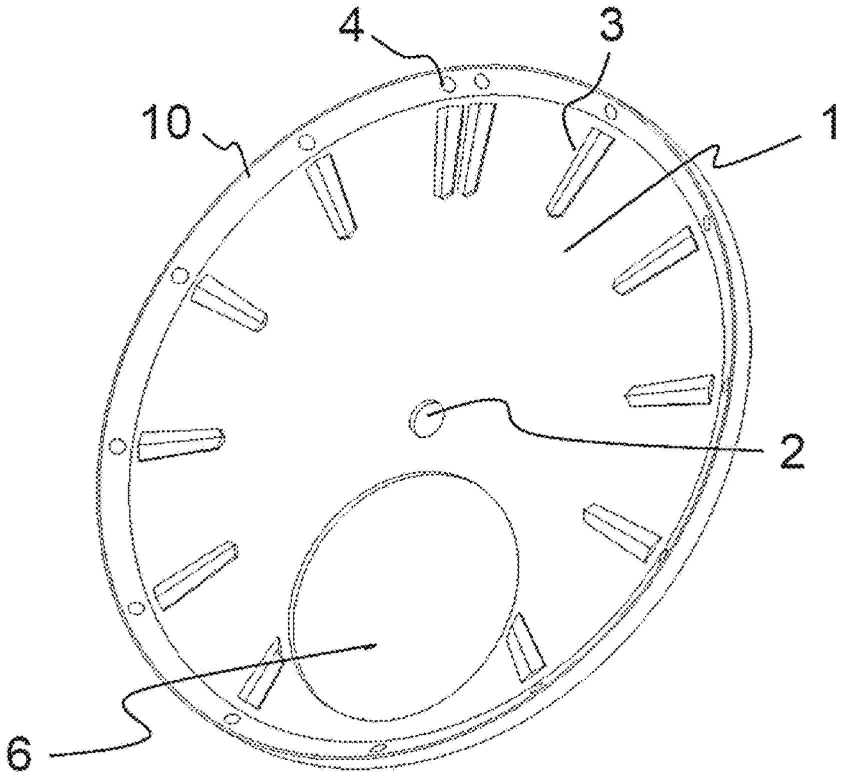
FIG. 5 shows a perspective illustration of a dial according to the invention according to a second embodiment, at a first viewing angle.
Figure 6:
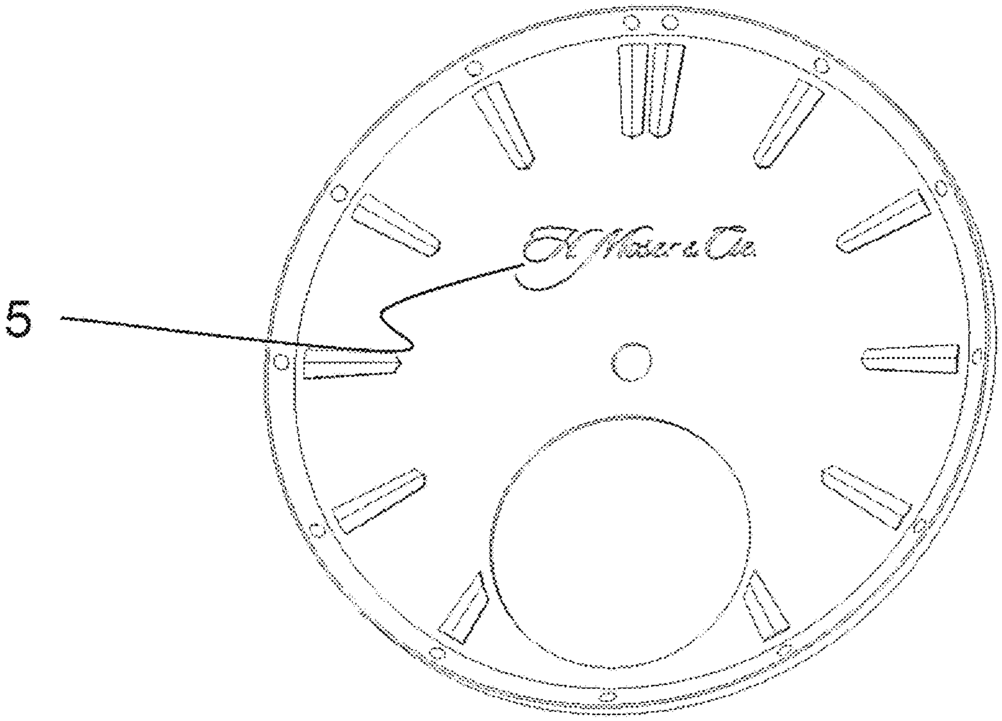
FIG. 6 shows a perspective illustration of the dial according to FIG. 5, at a second viewing angle.

FIGS. 5 and 6 illustrate a second embodiment. The dial here has a recess 6 for a tourbillon. Also in this example, the company logo is in turn transparent, and therefore it can be seen only at certain angles. In the position according to FIG. 5, it cannot be seen and remains invisible; in the position according to FIG. 6, it can be seen. Here too, the black border around the lettering is due to the pictorial illustration and is not actually present. On the contrary, the upwardly directed surface of the dial in the watch is preferably also light-impermeable or only partially permeable here, preferably is dark and/or preferably shiny and/or reflective.

A transparent dial covering can be attached over said dials. It can be designed as desired and in a known manner as it permits the two angles mentioned.

The dial according to the invention can be formed with a simple and nevertheless elegant appearance. In particular, it makes it possible to present a manufacturer's name without the latter influencing the appearance in a pronounced way.

The invention claimed is:

1. A dial for a watch, wherein the dial has a plate with a surface, with indicia on the surface, wherein some of the indicia is transparent, and wherein the transparent indicia is invisible at a first viewing angle of the surface of the dial and visible at a second viewing angle of the surface of the dial, and wherein the first viewing angle and the second viewing angle are angles with respect to a line of sight to the surface of the dial.

2. The dial as claimed in claim 1, wherein the plate is opaque or translucent at least below said transparent indicia.

3. The dial as claimed in claim 1, wherein a surface of the plate, on which the transparent indicia is presented, is glossy varnished, so that a reflected portion of an incident light is increased.

4. The dial as claimed in claim 1, wherein the transparent indicia comprises a manufacturer's name.

5. The dial as claimed in claim 1, wherein the transparent indicia comprises a manufacturer's logo.

6. The dial as claimed in claim 1, wherein the transparent indicia comprises a manufacturer's name and a manufacturer's logo.

7. The dial as claimed in claim 1, wherein, with the exception of a first passage opening for hands, the plate forms a continuously closed face without further passage openings.

8. The dial as claimed in claim 1, wherein, with the exception of a first passage opening and further passage openings for index displays and/or markings, the plate forms a continuously closed face without further passage openings.

9. The dial as claimed in claim 1, wherein the plate is made of metal and/or an alloy.

10. The dial as claimed in claim 1, wherein the plate is made of brass.

11. The dial as claimed in claim 1, wherein the transparent indicia is applied to the plate as an uppermost layer.

12. The dial as claimed in claim 1, wherein the transparent indicia is elevated above adjacent portions of the plate.

13. The dial as claimed in claim 1, wherein the transparent indicia is printed onto the plate.

14. The dial as claimed in claim 1 wherein the dial is a dial of a wristwatch.

15. A watch having a dial as claimed in claim 1, wherein the watch has a transparent dial covering which covers the dial, wherein, when the dial is viewed in a first direction with respect to the surface of the plate along the first viewing angle, the transparent indicia is invisible, and wherein, when the dial is viewed in a second direction, differing from the first direction, with respect to the surface of the plate along the second viewing angle, the transparent indicia is visible.

16. The watch as claimed in claim 15, wherein the watch is a wristwatch.

* * * * *